United States Patent
Huang et al.

(10) Patent No.: US 11,997,266 B2
(45) Date of Patent: May 28, 2024

(54) METHOD AND APPARATUS OF CROSS-COMPONENT ADAPTIVE LOOP FILTERING FOR VIDEO CODING

(71) Applicant: HFI Innovation Inc., Zhubei (TW)

(72) Inventors: Yu-Wen Huang, Hsinchu (TW); Chih-Wei Hsu, Hsinchu (TW); Ching-Yeh Chen, Hsinchu (TW); Tzu-Der Chuang, Hsinchu (TW); Shaw-Min Lei, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 277 days.

(21) Appl. No.: 17/627,732

(22) PCT Filed: Jul. 24, 2020

(86) PCT No.: PCT/US2020/043374
§ 371 (c)(1),
(2) Date: Jan. 17, 2022

(87) PCT Pub. No.: WO2021/021590
PCT Pub. Date: Feb. 4, 2021

(65) Prior Publication Data
US 2022/0256145 A1    Aug. 11, 2022

Related U.S. Application Data

(60) Provisional application No. 62/878,899, filed on Jul. 26, 2019.

(51) Int. Cl.
*H04N 19/117* (2014.01)
*H04N 19/186* (2014.01)

(52) U.S. Cl.
CPC ......... *H04N 19/117* (2014.11); *H04N 19/186* (2014.11)

(58) Field of Classification Search
CPC .......................... H04N 19/117; H04N 19/186
(Continued)

(56) References Cited

U.S. PATENT DOCUMENTS

| 10,419,757 B2 | 9/2019 | Chen et al. |
| 2014/0355695 A1 | 12/2014 | Lim et al. |

(Continued)

FOREIGN PATENT DOCUMENTS

| CN | 109691102 A | 4/2019 |
| WO | 2011/140960 A1 | 11/2011 |

(Continued)

OTHER PUBLICATIONS

Chinese language office action dated Apr. 15, 2023, issued in application No. CN 202080054358.6.
(Continued)

*Primary Examiner* — Allen C Wong
(74) *Attorney, Agent, or Firm* — McClure, Qualey & Rodack, LLP

(57) ABSTRACT

Methods and apparatus for loop-filter processing of reconstructed video are disclosed. According to one method, multiple CC-ALF (Cross-Component Adaptive Loop Filter) filters are used. Selection of the multiple CC-ALF filters can be signalled in one APS (Adaptation Parameter Set). According to another method, the CC-ALF can be implemented according to the difference between a to-be-process sample and its neighbouring sample.

13 Claims, 5 Drawing Sheets

(58) Field of Classification Search
USPC .................................................. 375/240.02
See application file for complete search history.

(56) References Cited

U.S. PATENT DOCUMENTS

| | | |
|---|---|---|
| 2016/0105685 A1 | 4/2016 | Zou et al. |
| 2018/0288441 A1 | 10/2018 | Zhang et al. |
| 2021/0120261 A1* | 4/2021 | Lim ..................... H04N 19/176 |
| 2022/0159249 A1* | 5/2022 | Taquet .................. H04N 19/46 |

FOREIGN PATENT DOCUMENTS

| | | |
|---|---|---|
| WO | 2012/155553 A1 | 11/2012 |
| WO | 2019/089695 A1 | 5/2019 |
| WO | 2020/262396 A1 | 12/2020 |

OTHER PUBLICATIONS

Misra, K., et al.; "Cross-Component Adaptive Loop Filter for chroma;" Joint Video Experts Team (JVET) of ITU-T SG 16 WP 3 and ISO/IEC JTC 1/SC 29/WG 11; Jul. 2019; pp. 1-9.
Taquet, J., et al.; "Non-Linear Adaptive Loop Filter;" Joint Video Experts Team (JVET) of ITU-T SG 16 WP 3 and ISO/IEC JTC 1/SC 29/WG 11; Jan. 2019; pp. 1-5.
Extended European Search Report dated May 4, 2023, issued in application No. EP 20846053.5.
International Search Report and Written Opinion dated Oct. 30, 2020, issued in application No. PCT/US2020/043374.
Chinese language office action dated Sep. 16, 2021, issued in application No. TW 109125135.

\* cited by examiner

METHOD AND APPARATUS OF CROSS-COMPONENT ADAPTIVE LOOP FILTERING FOR VIDEO CODING

CROSS REFERENCE TO RELATED APPLICATIONS

The present invention claims priority to U.S. Provisional Patent Application, Ser. No. 62/878,899, filed Jul. 26, 2019. The U.S. Provisional Patent Application is hereby incorporated by reference in its entirety.

FIELD OF THE INVENTION

The present invention relates to adaptive loop filter (ALF) processing in a video coding system. In particular, the present invention relates to Cross-Component ALF processing in a video encoder or decoder.

BACKGROUND

Motion estimation is an effective inter-frame coding technique to exploit temporal redundancy in video sequences. Motion-compensated inter-frame coding has been widely used in various international video coding standards. The motion estimation adopted in various coding standards is often a block-based technique, where motion information such as coding mode and motion vector is determined for each macroblock or similar block configuration. In addition, intra-coding is also adaptively applied, where the picture is processed without reference to any other picture. The inter-predicted or intra-predicted residues are usually further processed by transformation, quantization, and entropy coding to generate a compressed video bitstream. During the encoding process, coding artefacts are introduced, particularly in the quantization process. In order to alleviate the coding artefacts, additional processing has been applied to reconstructed video to enhance picture quality in newer coding systems. The additional processing is often configured in an in-loop operation so that the encoder and decoder may derive the same reference pictures to achieve improved system performance.

FIG. 1A illustrates an exemplary adaptive Inter/Intra video coding system incorporating in-loop processing including adaptive loop filter (ALF). For Inter-prediction, Motion Estimation (ME)/Motion Compensation (MC) 112 is used to provide prediction data based on video data from other picture or pictures. Switch 114 selects Intra Prediction 110 or inter-prediction data and the selected prediction data is supplied to Adder 116 to form prediction errors, also called residues. The prediction error is then processed by Transformation (T) 118 followed by Quantization (Q) 120. The transformed and quantized residues are then coded by Entropy Encoder 122 to form a video bitstream corresponding to the compressed video data. The bitstream associated with the transform coefficients is then packed with side information such as motion, mode, and other information associated with the image area. The side information may also be subject to entropy coding to reduce required bandwidth. Accordingly, the data associated with the side information are provided to Entropy Encoder 122 as shown in FIG. 1A. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, various in-loop processing is applied to the reconstructed video data before the reconstructed video data are stored in the Reference Picture Buffer 134 in order to improve video quality. In video coding systems, various in-loop filters such as Deblocking Filter (DF) 130, Sample Adaptive Offset (SAO) 131 and Adaptive Loop Filter (ALF) 132 have been used to enhance picture quality.

A corresponding decoder for the encoder of FIG. 1A is shown in FIG. 1B. The video bitstream is decoded by Entropy Decoder 142 to recover the transformed and quantized residues. At the decoder side, only Motion Compensation (MC) 113 is performed instead of ME/MC. The decoding process is similar to the reconstruction loop at the encoder side. The recovered transformed and quantized residues, SAO/ALF information and other system information are used to reconstruct the video data. The reconstructed video is further processed by DF 130, SAO 131 and ALF 132 to produce the final enhanced decoded video.

Cross-Component ALF Processing

In JVET-O0636 (Kiran Misra, et al., "Cross-Component Adaptive Loop Filter for chroma", Joint Video Experts Team (JVET) of ITU-T SG 16 WP 3 and ISO/IEC JTC 1/SC 29/WG 11, 15th Meeting: Gothenburg, SE, 3-12 Jul. 2019, Document: JVET-O0636), Cross-Component Adaptive Loop Filter (CC-ALF) is proposed. CC-ALF makes use of luma sample values to refine each chroma component. FIG. 2A illustrates the structure of CC-ALF with respect to the other loop filters according to JVET-O0636. In FIG. 2A, the ALF processing is performed after respective SAO (210, 212 and 214). In a conventional video coding system, only ALF Luma 220 and ALF Chroma 230 are used. In JVET-O0636, two additional ALF filters, i.e., CC ALF Cb 222 and CC ALF Cr 224 are used to derive adjustment signals to add to ALF processed Cb and Cr using adders 240 and 242 respectively.

In CC-ALF operates by applying a linear, diamond shaped filter to the luma channel for each chroma component as shown in FIG. 2B according to JVET-O0636. The filter coefficients are transmitted in the APS, scaled by a factor of $2^{10}$, and rounded for fixed point representation. The application of the filters is controlled on a variable block size and signalled by a context-coded flag received for each block of samples. The block size along with a CC-ALF enabling flag is received at the slice-level for each chroma component. Syntax and semantics for CC-ALF are also disclosed in JVET-O0636.

Non-Linear ALF Operations

In VTM3.0 (VVC (Versatile Video Coding) Test Model Ver. 3.0), the filtering process of the Adaptive Loop Filter, is performed as follows:

$$O(x,y)=\Sigma_{(i,j)}w(i,j)\cdot I(x+i,y+j), \qquad (1)$$

In the above equation, samples I(x+i, y+j) are input samples, O(x, y) is the filtered output sample (i.e. filter result), and w(i, j) denotes the filter coefficients. Since the ALF is applied to the reconstructed samples, samples I(x+i, y+j) correspond to reconstructed samples. The center reconstructed pixel at a center location of the ALF processing corresponds to (i, j)=(0, 0), i.e., I(x, y). In practice, in VTM3.0, it is implemented using integer arithmetic for fixed point precision computations:

$$O(x, y) = \left(\sum_{i=-\frac{L}{2}}^{\frac{L}{2}} \sum_{j=-\frac{L}{2}}^{\frac{L}{2}} w(i, j) \cdot I(x + i, y + j) + 64\right) \gg 7, \quad (2)$$

In the above equation, L denotes the filter length, and where w(i, j) are the filter coefficients in fixed point precision.

If the sum of filter coefficients is forced to be one, equation (1) can be reformulated, without coding efficiency impact, in the following expression:

$$O(x,y) = I(x,y) + \Sigma_{(i,j)\neq(0,0)} w(i,j) \cdot (I(x+i,y+j) - I(x,y)), \quad (3)$$

In the above equation, w(i, j) are the same filter coefficients as in equation (1) except for w(0, 0), which is equal to 1 in equation (3) while it is equal to $(1-\Sigma_{(i,j)\neq(0,0)} w(i, j))$ in equation (1).

Using the above filter formula of equation (3), we can easily introduce nonlinearity to make ALF more efficient by using a simple clipping function to reduce the impact of neighbour sample values (I(x+i, y+j)) when they are very different from the current sample value (I(x, y)) being filtered.

In JVET-M0385 ((J. Taquet, et al., "Non-Linear Adaptive Loop Filter", in Joint Video Exploration Team (JVET) of ITU-T SG 16 WP 3 and ISO/IEC JTC 1/SC 29/WG 11, 13th Meeting: Marrakech, MA, 9-18 Jan. 2019, Document: JVET-M0385)), a non-linear ALF is disclosed. It introduces an adaptive clipping operation on the input samples values of the Adaptive Loop Filter in test software VTM3.0. The goal of this adaptive clipping is to introduce some non-linearities to limit the difference between the input sample value to be filtered and the other neighbour input sample values of the filter.

According to JVET-M0385, the ALF filter operation is modified as follows:

$$O'(x,y) = I(x,y) + \Sigma_{(i,j)\neq(0,0)} w(i,j) \cdot K(I(x+i,y+j) - I(x,y), k(i, j)), \quad (4)$$

In the above equation, O'(x,y) corresponds to the modified ALF filter output, I(x,y) corresponds to sample before ALF, K(d, b)=min (b, max(−b, d)) is the clipping function, and k(i,j) are clipping parameters, which depends on filter coefficient at the (i,j). The encoder performs the optimization to find the best k(i,j).

In the implementation according to JVET-M0385, the clipping parameters k(i,j) are specified for each ALF filter, where one clipping value is signalled per filter coefficient. It means that 12 clipping values are signalled in the bitstream per Luma filter and 6 clipping values for the Chroma filter.

In order to limit the signalling cost and the encoder complexity, the clipping values are limited to a small set of possible values in JVET-M0385. Furthermore, only use 4 possible values are used for Inter slices and 3 possible values are used for Intra slices.

Because the variance of the local differences is often higher for Luma than for Chroma, two different sets are used for the Luma and Chroma filters. Furthermore, the maximum sample value is included in each set, so that clipping can be disabled if it is not necessary.

The proposed sets of clipping values according to JVET-M0385 are provided in Table 1.

TABLE 1

Allowed clipping values

| | INTRA | INTER |
|---|---|---|
| LUMA | {10, 102, 1024} | {6, 32, 181, 1024} |
| CHROMA | {4, 24, 1024} | {4, 25, 161, 1024} |

The clipping values are encoded in the slice header using a Golomb encoding corresponding to the index of the clipping value in the set.

In this application, techniques to improve the coding performance for CC-ALF are disclosed. Also, techniques associated with signalling for the improved CC-ALF are also disclosed.

BRIEF SUMMARY OF THE INVENTION

Methods and apparatus for loop-filter processing of reconstructed video are disclosed. According to this method, reconstructed chroma samples and related reconstructed luma samples in a colour picture are received. A target first ALF is selected from a plurality of first ALF candidates. First ALF processing corresponding to the target first ALF is applied to the related reconstructed luma samples to generate a first filtered chroma sample for the to-be-processed reconstructed chroma sample. A final filtered chroma sample comprising the first filtered chroma sample is generated, wherein the final filtered chroma sample is used as a video decoding output or used for further video encoding or decoding process.

In one embodiment, second ALF (Adaptive Loop Filter) processing is applied to the reconstructed chroma samples to generate a second filtered chroma sample for a to-be-processed reconstructed chroma sample, where the final filtered chroma sample is generated by combining the first filtered chroma sample and the second filtered chroma sample. In one embodiment, the second ALF processing corresponding to a target second ALF, and selection of the target first ALF from the plurality of first ALF candidates is implicitly derived according to selection of the target second ALF from a plurality of second ALF candidates.

In one embodiment, information regarding selection of the target first ALF from the plurality of first ALF candidates is signalled in or parsed from a CTB (Coding Tree Block) level, CU (Coding Unit) level or block level.

In one embodiment, the plurality of first ALF candidates is signalled in or parsed from one APS (Adaptation Parameter Set) at an encoder side or parsed from one APS at a decoder side. Furthermore, the plurality of first ALF candidates in one APS can be signalled or parsed independently from a plurality of second ALF candidates in one APS.

According to another method, reconstructed chroma samples and related reconstructed luma samples in a colour picture are received. First ALF processing is applied to the related reconstructed luma samples to generate a first filtered chroma sample for a to-be-processed reconstructed chroma sample, wherein derivation of the first filtered chroma sample comprises at least one first difference between a to-be-processed related reconstructed luma sample (that is corresponding to the to-be-processed reconstructed chroma sample) and a first neighbouring related reconstructed luma sample of the to-be-processed related reconstructed luma sample. A final filtered chroma sample comprising the first filtered chroma sample is generated, wherein the final filtered chroma sample is used as a video decoding output or used for further video encoding or decoding process.

In one embodiment, second ALF processing is applied to the reconstructed chroma samples for the to-be-processed reconstructed chroma sample to generate a second filtered chroma sample. In one embodiment, derivation of the second filtered chroma sample comprises at least one second difference between the to-be-processed reconstructed chroma sample and a second neighbouring chroma sample of the to-be-processed reconstructed chroma sample.

DETAILED DESCRIPTION OF THE INVENTION

Figure 1A:
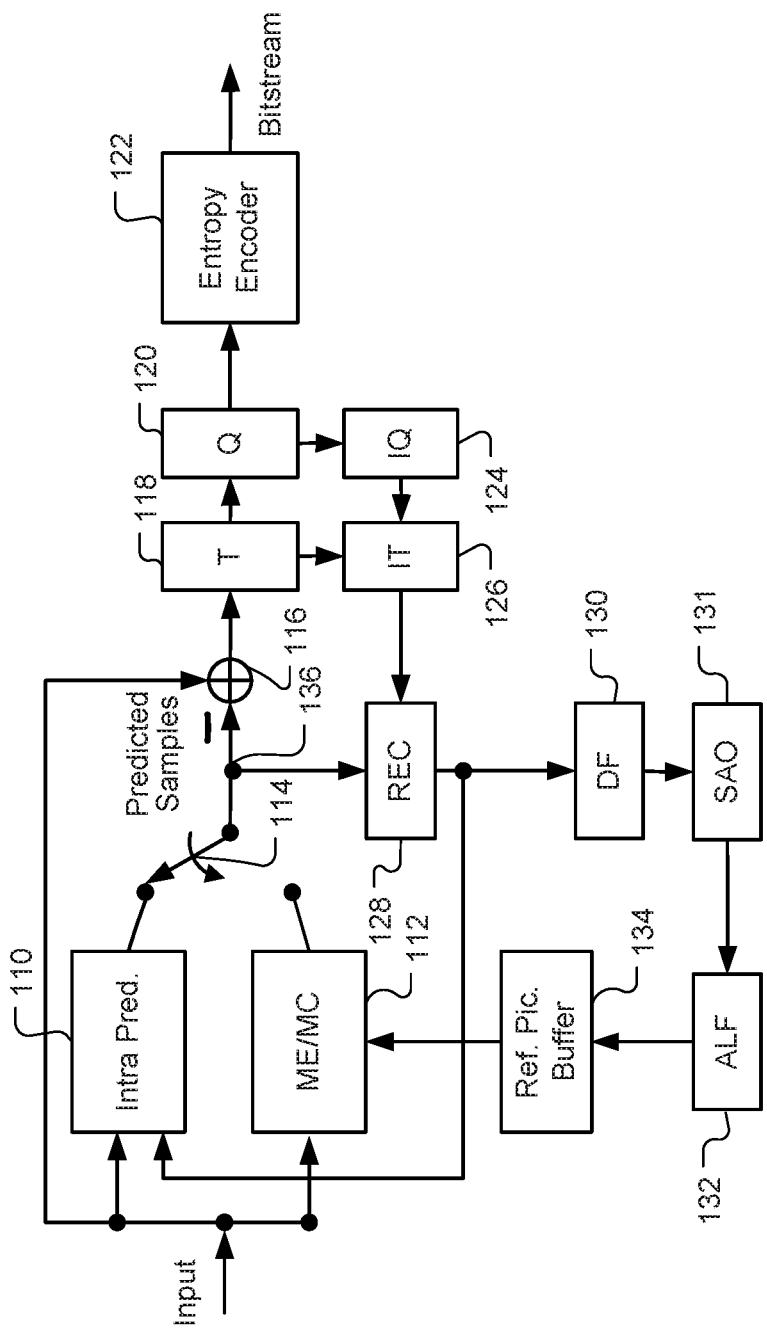
FIG. 1A illustrates an exemplary adaptive inter/intra video encoding system incorporating DF, SAO and ALF in-loop processing.
Figure 1B:
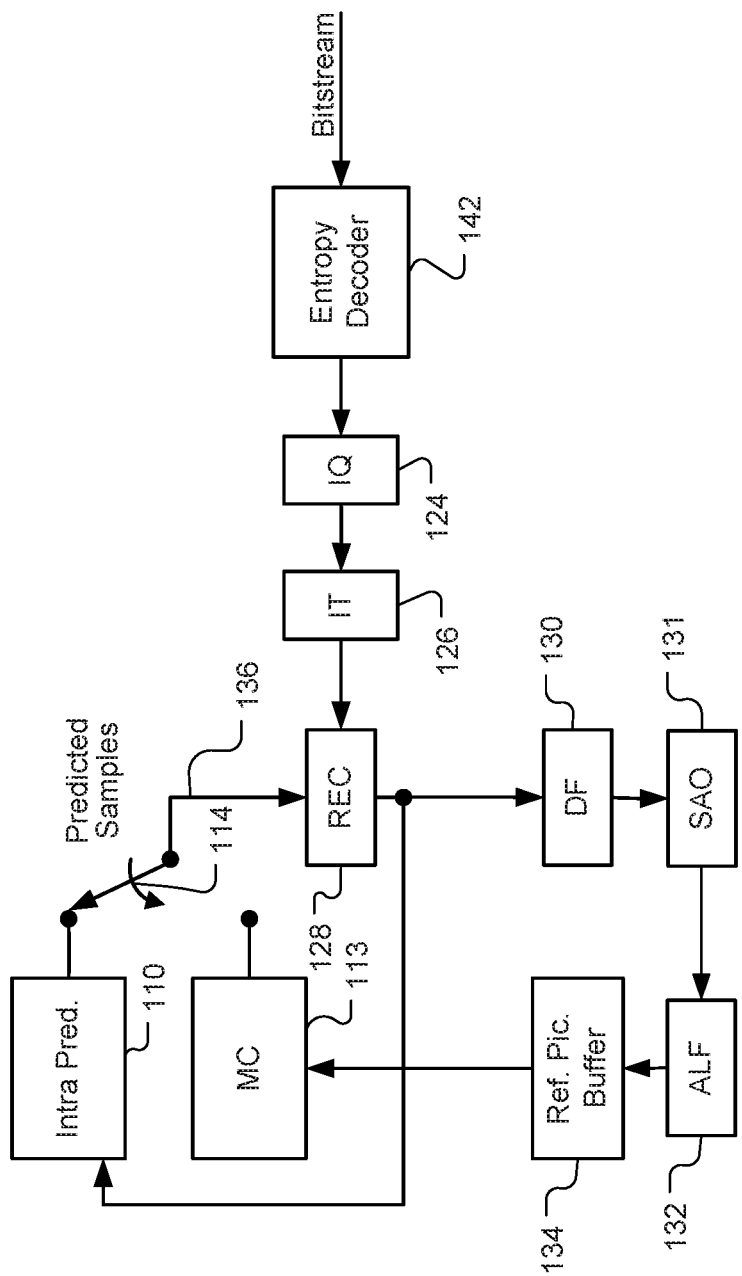
FIG. 1B illustrates an exemplary adaptive inter/intra video decoding system incorporating DF, SAO and ALF in-loop processing.
Figure 2A:
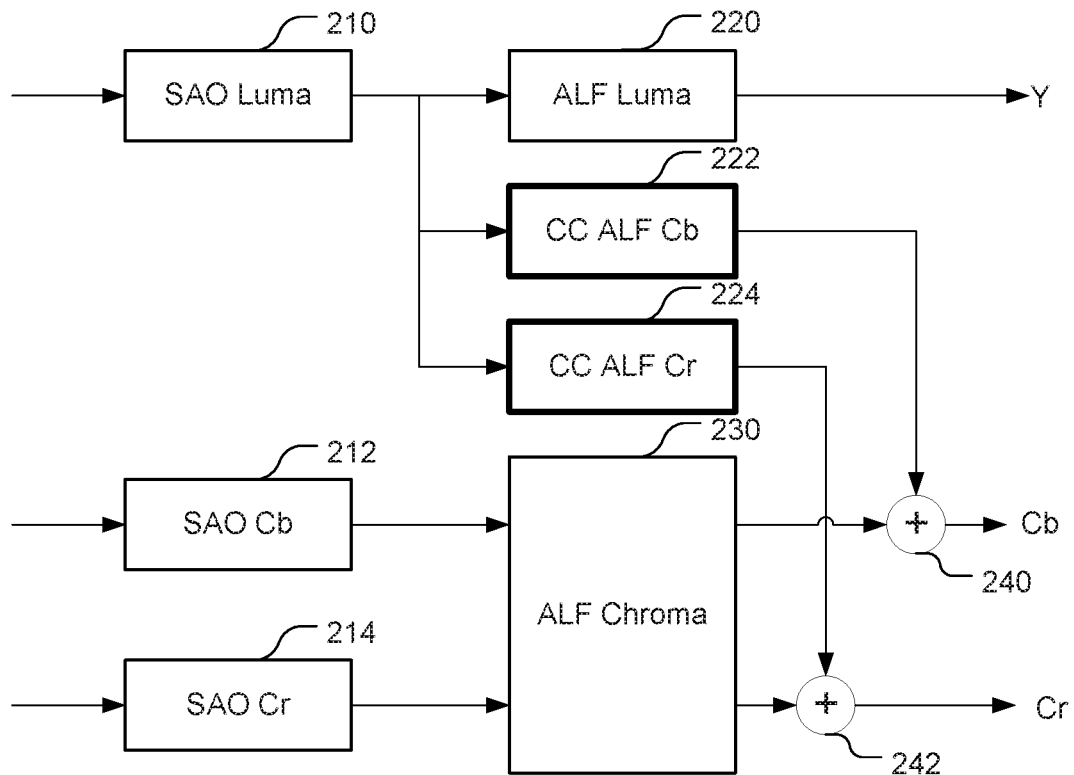
FIG. 2A illustrates the structure of CC-ALF with respect to the other loop filters according to JVET-O0636 where the ALF processing is performed after respective SAO.
Figure 2B:
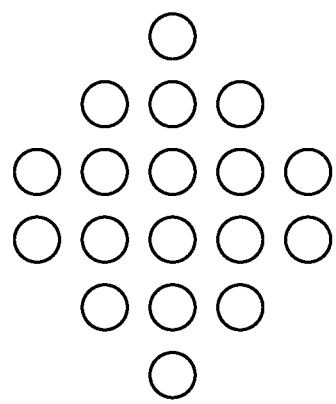
FIG. 2B illustrates the diamond shaped filter applied to the luma channel for each chroma component according to JVET-O0636.

The following description is of the best-contemplated mode of carrying out the invention. This description is made for the purpose of illustrating the general principles of the invention and should not be taken in a limiting sense. The scope of the invention is best determined by reference to the appended claims.

Method 1: Corresponding Luma Sample Positions for CC-ALF

In CC-ALF, one additional filter is added for the chroma component and the filtered output is the weighted sum of the original chroma filter and the additional filter. If the video format is YUV444 or RGB444, the corresponding luma sample of to-be-processed chroma samples is well-defined by using the same spatial position in different colour components. However, if the video format is non YUV444 or RGB444, such as YUV420 or YUV422, the definition of corresponding luma sample in CC-ALF becomes an issue. According to one embodiment of the present invention, the corresponding luma sample is down-sampled according to YUV format or the sampling positions of chroma. For example, if the video format is YUV420 and the sampling position of chroma is (0, 0.5) in terms of luma position, the corresponding luma sample can be one among four luma samples. In another example, the corresponding luma sample can be the average of the left two luma samples. In another case, the corresponding luma sample can be the average of the four luma samples. The filter footprint can be defined in terms of chroma position or luma position. If the filter footprint is defined in terms of chroma samples, the inputs of CC-ALF filtering process can be the corresponding luma samples mentioned in the above. If the filter footprint is defined in terms of luma positions, the center position of the filter-shape of CC-ALF is defined by the corresponding luma sample of the to-be-processed chroma sample. In one embodiment, the definition of the corresponding luma sample is dependent on the video format or the sampling position of chroma component.

Method 2: CC-ALF Implementation

In another embodiment, a non-linear clipping operation can be applied to CC-ALF. The difference between neighbouring samples and to-be-processed sample can be used in the filtering process instead of using the neighbouring samples directly. The to-be-processed sample can be the sample value in the chroma component, or the sample value of the corresponding luma sample in CC-ALF.

In another embodiment, the precision of filter coefficients in the additional filter in CC-ALF is aligned with the original ALF design.

Method 3: Multiple CC-ALF Filters

In another embodiment, multiple CC-ALF filters can be used in one slice/brick/tile/picture. When multiple CC-ALF filters are used, the selection of multiple CC-ALF filters can be explicitly signalled at a CTB level, CU level, or block level. In another embodiment, the selection of multiple CC-ALF filters can be implicitly derived according to the selection of multiple chroma filters. When multiple CC-ALF filters are used, they can be signalled independently in one APS (Adaptation Parameter Set) or coupled with multiple chroma filters. For example, two sets of multiple filters, one for CC-ALF and the other for chroma filters, are separately signalled in one APS. In another case, only one set of multiple filters is signalled in one APS, and each candidate in this set includes one of chroma filter and CC-ALF filter at least.

In another embodiment, the chroma filter and CC-ALF filter cannot be used at the same time. In other words, for each to-be-processed chroma sample, only one of chroma filter and CC-ALF filter can be applied at most. In one embodiment, the filter shape of these two filter can be further unified. In another embodiment, one flag is signalled for each filter to indicate whether the filter type is chroma filter or CC-ALF filter.

In another embodiment, the proposed method is applied to the luma ALF. That is, the ALF output for luma component is also affected by the corresponding chroma samples. In one example, two filters are added, and the inputs of one filter are Cb component, and the inputs of the other filter are Cr component. And the ALF output is the weighted sum of the outputs of these two additional filters and the original one. In another case, only one filter is added, but the inputs of this filter is one of the combinations including Cb, Cr, and the average of Cb and Cr.

Any of the foregoing proposed methods can be implemented in encoders and/or decoders. For example, any of the proposed methods can be implemented in an in-loop filtering module of an encoder and/or a decoder. Alternatively, any of the proposed methods can be implemented as a circuit coupled to in-loop filtering module of the encoder and/or the decoder.

Figure 3:
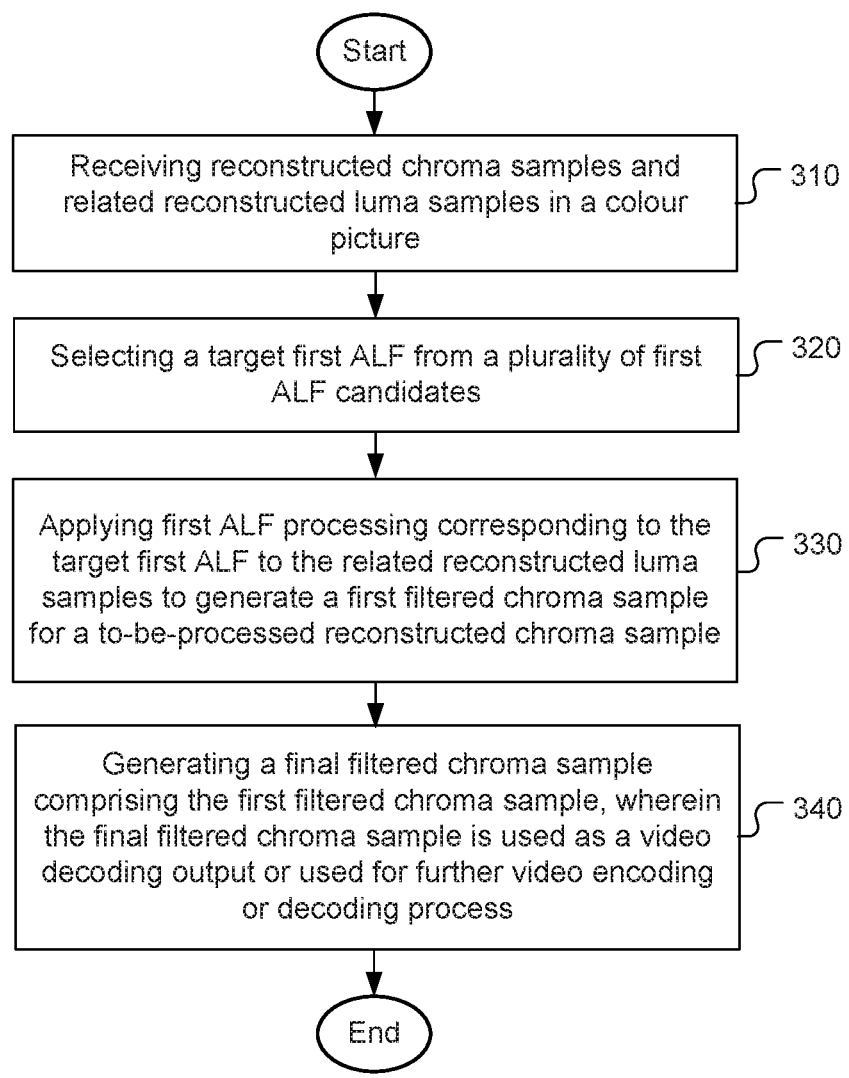
FIG. 3 illustrates a flowchart of an exemplary loop filtering processing of reconstructed video according to an embodiment of the present invention, where a plurality of CC-ALF filters are used.

FIG. 3 illustrates a flowchart of an exemplary loop filtering processing of reconstructed video according to an embodiment of the present invention, where a plurality of CC-ALF filters are used. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, reconstructed chroma samples and related reconstructed luma samples in a colour picture are received in step 310. A target first ALF is selected from a plurality of first ALF candidates in step 320. First ALF processing corresponding to a target first ALF is applied to the related reconstructed luma samples to generate a first filtered chroma sample for the to-be-processed reconstructed chroma sample in step 330. A final filtered chroma sample comprising the first filtered chroma sample is generated, wherein the final filtered chroma sample is used as a video decoding output or used for further video encoding or decoding process in step 340.

Figure 4:
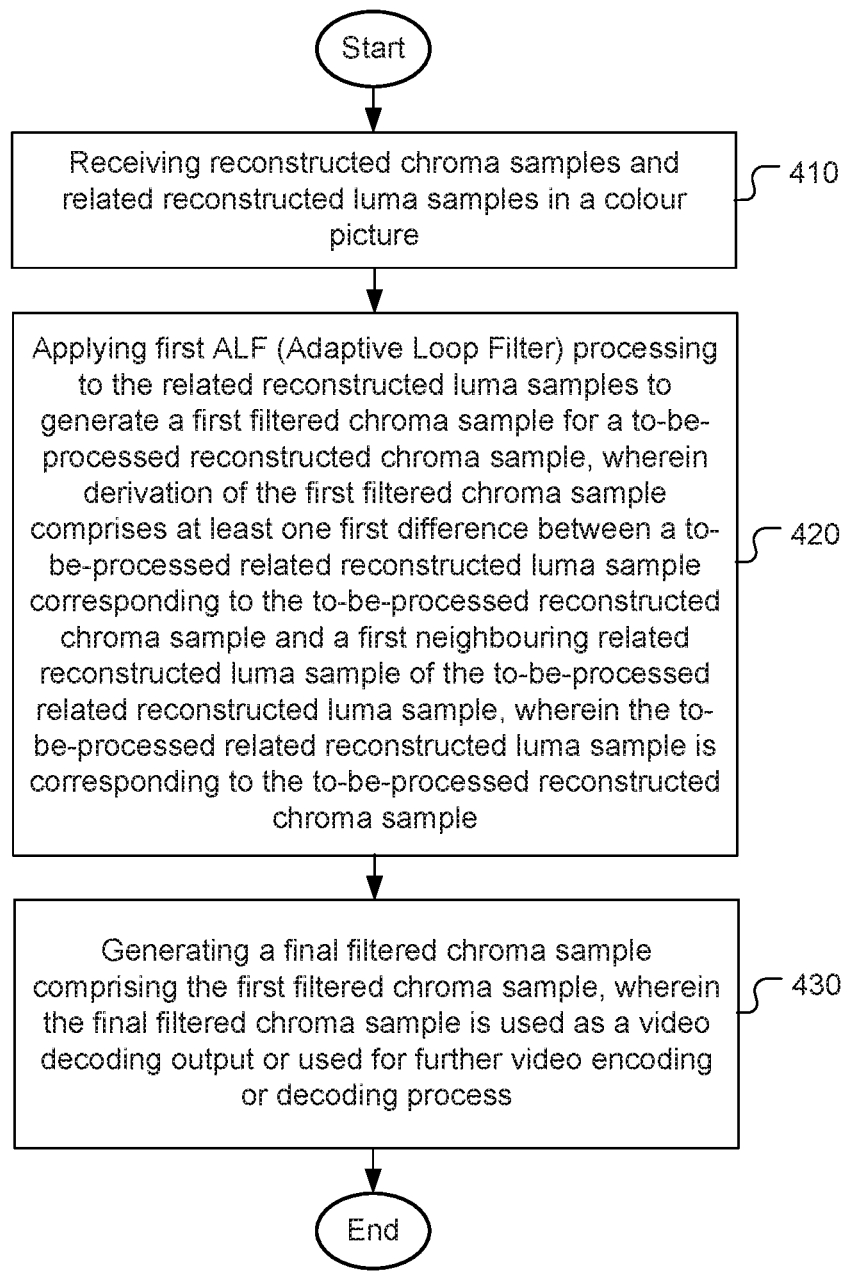
FIG. 4 illustrates a flowchart of an exemplary ALF processing of reconstructed video according to an embodiment of the present invention, where information of multiple CC-ALF filters is signalled in one APS (Adaptation Parameter Set).

FIG. 4 illustrates a flowchart of an exemplary ALF processing of reconstructed video according to an embodiment of the present invention, where information of multiple CC-ALF filters is signalled in one APS (Adaptation Parameter Set). According to this method, reconstructed chroma samples and related reconstructed luma samples in a colour picture are received in step 410. First ALF (Adaptive Loop Filter) processing is applied to the related reconstructed luma samples to generate a first filtered chroma sample for a to-be-processed reconstructed chroma sample in step 420, wherein derivation of the first filtered chroma sample comprises at least one first difference between a to-be-processed related reconstructed luma sample (that is corresponding to the to-be-processed reconstructed chroma sample) and a first neighbouring related reconstructed luma sample of the to-be-processed related reconstructed luma sample. A final filtered chroma sample comprising the first filtered chroma sample is generated in step 430, wherein the final filtered chroma sample is used as a video decoding output or used for further video encoding or decoding process.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

Abstract

Methods and apparatus for loop-filter processing of reconstructed video are disclosed. According to one method, multiple CC-ALF (Cross-Component Adaptive Loop Filter) filters are used. Selection of the multiple CC-ALF filters can be signalled in one APS (Adaptation Parameter Set). According to another method, the CC-ALF can be implemented according to the difference between a to-be-process sample and its neighbouring sample.

The invention claimed is:

1. A method for video coding, the method comprising:
receiving reconstructed chroma samples and related reconstructed luma samples in a color picture;
selecting a target first ALF (Adaptive Loop Filter) from a plurality of first ALF candidates;
applying first ALF processing corresponding to the target first ALF to the related reconstructed luma samples to generate a first filtered chroma sample for a to-be-processed reconstructed chroma sample; and
generating a final filtered chroma sample comprising the first filtered chroma sample, wherein the final filtered chroma sample is used as a video decoding output or used for further video encoding or decoding process.

2. The method of claim 1, further comprising applying second ALF processing to the reconstructed chroma samples to generate a second filtered chroma sample for the to-be-processed reconstructed chroma sample, wherein the final filtered chroma sample is generated by combining the first filtered chroma sample and the second filtered chroma sample.

3. The method of claim 2, wherein the second ALF processing corresponding to a target second ALF, and selection of the target first ALF from the plurality of first ALF candidates is implicitly derived according to selection of the target second ALF from a plurality of second ALF candidates.

4. The method of claim 1, wherein information regarding selection of the target first ALF from the plurality of first ALF candidates is signalled in or parsed from a CTB (Coding Tree Block) level, CU (Coding Unit) level or block level.

5. The method of claim 1, wherein the plurality of first ALF candidates is signalled in or parsed from one APS (Adaptation Parameter Set) at an encoder side or parsed from one APS at a decoder side.

6. The method of claim 5, wherein the plurality of first ALF candidates in one APS is signalled or parsed independently from a plurality of second ALF candidates in one APS.

7. An apparatus for video coding, the apparatus comprising one or more electronic circuits or processors arranged to:
   receive reconstructed chroma samples and related reconstructed luma samples in a color picture;
   select a target first ALF (Adaptive Loop Filter) from a plurality of first ALF candidates;
   apply first ALF processing corresponding to the target first ALF to the related reconstructed luma samples to generate a first filtered chroma sample for a to-be-processed reconstructed chroma sample; and
   generate a final filtered chroma sample comprising the first filtered chroma sample, wherein the final filtered chroma sample is used as a video decoding output or used for further video encoding or decoding process.

8. The apparatus of claim 7, wherein said one or more electronic circuits or processors are further arranged to apply second ALF processing to the reconstructed chroma samples to generate a second filtered chroma sample for the to-be-processed reconstructed chroma sample, wherein the final filtered chroma sample is generated by combining the first filtered chroma sample and the second filtered chroma sample.

9. A method for video coding, the method comprising:
   color receiving reconstructed chroma samples and related reconstructed luma samples in a color picture;
   applying first ALF (Adaptive Loop Filter) processing to the related reconstructed luma samples to generate a first filtered chroma sample for a to-be-processed reconstructed chroma sample, wherein derivation of the first filtered chroma sample comprises at least one first difference between a to-be-processed related reconstructed luma sample and a first neighboring related reconstructed luma sample of the to-be-processed related reconstructed luma sample, wherein the to-be-processed related reconstructed luma sample is corresponding to the to-be-processed reconstructed chroma sample; and
   generating a final filtered chroma sample comprising the first filtered chroma sample, wherein the final filtered chroma sample is used as a video decoding output or used for further video encoding or decoding process.

10. The method of claim 9, further comprising applying second ALF processing to the reconstructed chroma samples to generate a second filtered chroma sample for the to-be-processed reconstructed chroma sample and the final filtered chroma sample is generated by combining the first filtered chroma sample and the second filtered chroma sample.

11. The method of claim 9, wherein derivation of the second filtered chroma sample comprises at least one second difference between the to-be-processed reconstructed chroma sample and a second neighbouring chroma sample of the to-be-processed reconstructed chroma sample.

12. An apparatus for video coding, the apparatus comprising one or more electronic circuits or processors arranged to:
   receive reconstructed chroma samples and related reconstructed luma samples in a color picture;
   apply first ALF (Adaptive Loop Filter) processing to the related reconstructed luma samples to generate a first filtered chroma sample for a to-be-processed reconstructed chroma sample, wherein derivation of the first filtered chroma sample comprises at least one first difference between a to-be-processed related reconstructed luma sample and a first neighboring related reconstructed luma sample of the to-be-processed related reconstructed luma sample, wherein the to-be-processed related reconstructed luma sample is corresponding to the to-be-processed reconstructed chroma sample; and
   generate a final filtered chroma sample comprising the first filtered chroma sample, wherein the final filtered chroma sample is used as a video decoding output or used for further video encoding or decoding process.

13. The apparatus of claim 12, further comprising applying second ALF processing to the reconstructed chroma samples to generate a second filtered chroma sample for the to-be-processed reconstructed chroma sample and the final filtered chroma sample is generated by combining the first filtered chroma sample and the second filtered chroma sample.

* * * * *